United States Patent
Chen et al.

(10) Patent No.: US 8,872,779 B2
(45) Date of Patent: Oct. 28, 2014

(54) METHOD AND SOFTWARE FOR TESTING TOUCH PANELS

(75) Inventors: Chun-Nan Chen, Tainan (TW); Pei-Hsu Wang, Tainan (TW); Tsung-Hsien Hsu, Tainan (TW); Chia-Lung Wang, Tainan (TW); Po-Hua Chen, Tainan (TW); Wei-Shuo Hsu, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 264 days.

(21) Appl. No.: 13/441,902

(22) Filed: Apr. 8, 2012

(65) Prior Publication Data

US 2013/0162548 A1 Jun. 27, 2013

(30) Foreign Application Priority Data

Dec. 26, 2011 (TW) .............................. 100148700 A

(51) Int. Cl.
  *G06F 3/041* (2006.01)
(52) U.S. Cl.
  USPC ............. 345/173; 345/87; 345/104; 349/150; 349/152; 178/18.01; 178/18.07

(58) Field of Classification Search
  USPC ............................ 345/173–178, 204, 87, 90; 178/18.01–18.09; 349/150–152; 257/670
  See application file for complete search history.

(56) References Cited

U.S. PATENT DOCUMENTS

| | | | | |
|---|---|---|---|---|
| 2005/0107977 | A1* | 5/2005 | Edwards et al. | 702/118 |
| 2007/0200831 | A1* | 8/2007 | Wang | 345/173 |
| 2008/0068229 | A1* | 3/2008 | Chuang | 341/34 |
| 2009/0315835 | A1* | 12/2009 | De Goes et al. | 345/173 |

* cited by examiner

*Primary Examiner* — Shaheda Abdin
(74) *Attorney, Agent, or Firm* — The PL Law Group, PLLC

(57) ABSTRACT

The method for testing a touch panel includes steps of providing the touch panel, providing a software for testing the touch panel, and determining the data variable parameter corresponding to the touch panel so as to test the touch panel. The software contains a data variable parameter, which includes one selected from a group consisting of an interface setting variable parameter, a touch controller IC variable parameter, an automatic test variable parameter, a manual test variable parameter and a combination thereof.

17 Claims, 8 Drawing Sheets

METHOD AND SOFTWARE FOR TESTING TOUCH PANELS

CROSS REFERENCE TO RELATED APPLICATIONS

The application claims the benefit of Taiwan Patent Application No. 100148700, filed on Dec. 26, 2011, at the Taiwan Intellectual Property Office, the disclosures of which are incorporated herein in their entirety by reference.

FIELD OF THE INVENTION

The present invention relates to a testing method and testing software, especially to a method and software for testing touch panels.

BACKGROUND OF THE INVENTION

As the technologies of the touch panels are continuously advancing, the sensitivity and accuracy of the touch control have been significantly raised so that touch panels are gradually and widely applied to various portable electronic devices, e.g. cellular phones, tablet personal computers (PCs), digital cameras, global positioning system (GPS) devices, etc. In addition, touch panels are also applied to ticket issuing machines, tour information machines, etc. in the public places. In this era of fast communication of information, touch panels have become the technical tools frequently used by the general people.

Almost all the touch panels must undergo a series of tests to make sure that the sensitivity and the accuracy of these touch panels can meet the requirements. However, the touch panels with different sizes have different requirements and specifications. There exist significant variations in the touch controller IC to be used, sizes of the glass and the coordinates electrically sent during the touch on the screen, for the touch panels with different specifications. Thus, the test program suitably applied to the touch panel with some specification can not be applied to another touch panel with another specification, and when a touch panel with different specifications from those of the previous one is going to be tested, a specific test program corresponding to the specifications of the touch panel to be tested is required.

Since currently the touch panels have been widely applied to various products with various sizes, the specifications for various touch panels become quite diversified. Accordingly various test programs corresponding to various specifications are required in the test processes during the manufacture of touch panels, the inconvenience therefrom is generated, production cost is increased, and an effective solution is highly needed.

For overcoming the mentioned problems occurring in the current test processes for the touch panels, a novel method and software for testing touch panels are provided in the present invention with the advantages of is high convenience and efficiency after a lot of researches, analyses and experiments by the inventors.

SUMMARY OF THE INVENTION

The present invention provides the method and the software for testing touch panels.

In accordance with one aspect of the present invention, a method for testing a touch panel is provided. The method comprises steps of providing the touch panel; providing a software for testing the touch panel, wherein the software contains a data variable parameter including one selected from a group consisting of an interface setting variable parameter, a touch controller IC variable parameter, an automatic test variable parameter, a manual test variable parameter and a combination thereof; and determining the data variable parameter corresponding to the touch panel so as to test the touch panel.

In accordance with another aspect of the present invention, a software for testing a touch panel is provided. The software comprises a data variable parameter including one selected from a group consisting of an interface setting variable parameter, a touch controller IC variable parameter, an automatic test variable parameter, a manual test variable parameter and a combination thereof.

The above objects and advantages of the present invention will become more readily apparent to those ordinarily skilled in the art after reviewing the following detailed descriptions and accompanying drawings, in which:

DETAILED DESCRIPTION

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
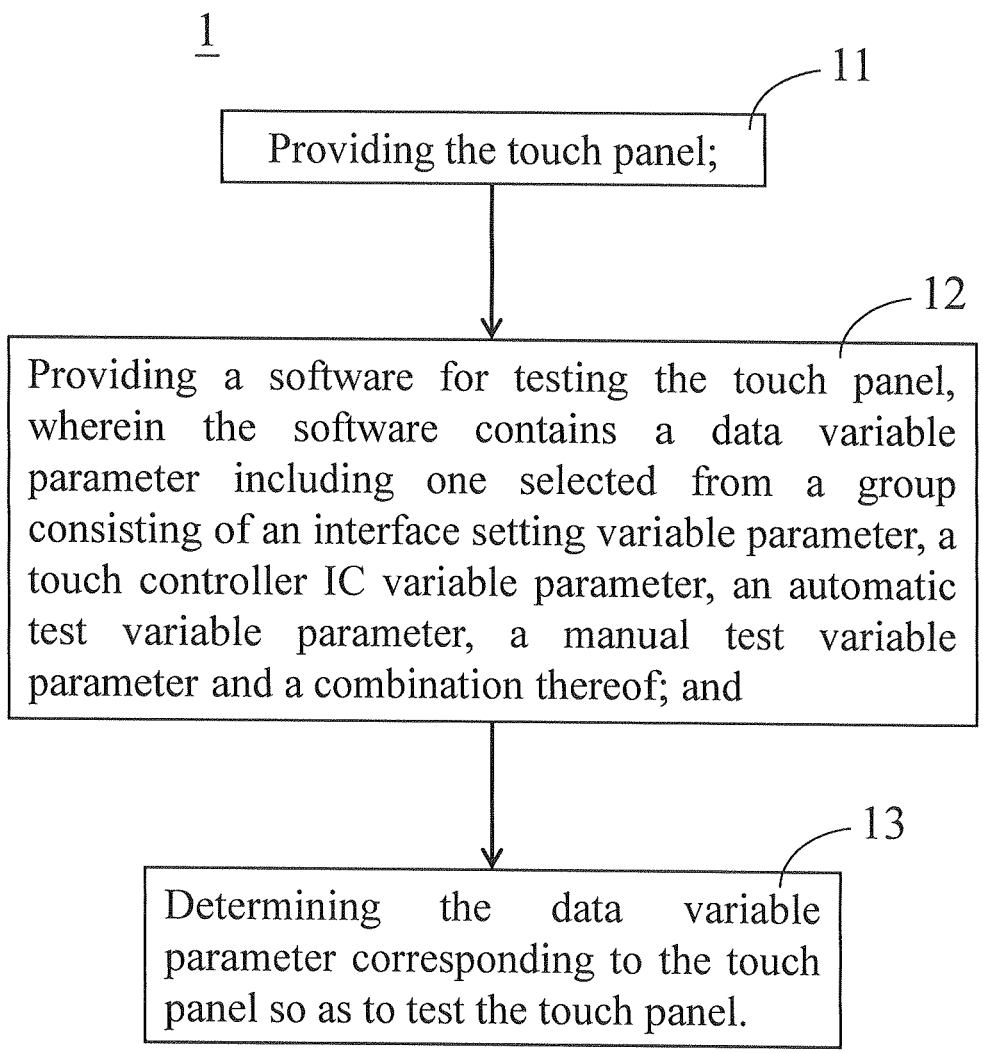
FIG. 1 is the schematic diagram showing a flowchart of a is method for testing a touch panel in one embodiment of the present invention.

FIG. 1 shows a flowchart of a method for testing a touch panel in one embodiment of the present invention. In FIG. 1, the method 1 for testing a touch panel includes the step 11 of providing the touch panel, the step 12 of providing a software for testing the touch panel, wherein the software contains a data variable parameter, which includes one selected from a group consisting of an interface setting variable parameter, a touch controller IC variable parameter, an automatic test variable parameter, a manual test variable parameter and a combination thereof, and the step 13 of determining the data variable parameter corresponding to the touch panel so as to test the touch panel.

In this embodiment, the software for testing a touch panel includes the data variable parameter. The data variable parameter corresponding to the touch panel can be determined by the user based on the actual touch panel to be tested.

Therefore, the method for testing a touch panel in this embodiment can be used to test the touch panels with various sizes and specifications. It is no longer required to change the test programs corresponding to the sizes and specifications for the touch panels to be tested as required in the prior art. Thus, the method for testing a touch panel in this embodiment can provide convenience and is able to effectively reduce the cost.

The software for testing a touch panel in the above embodiment can optionally include a data unit and an application program, wherein the data unit includes the data variable parameter, and the application program can optionally include a touch trace display unit, an automatic test unit and a manual test unit.

The step 12 of providing a software for testing the touch panel in the above embodiment can optionally include the sub-steps of providing a computer, and installing the software into the computer. The step 13 of determining the data variable parameter corresponding to the touch panel in the above embodiment can optionally include the sub-steps of allowing a user to use the data unit of the software in the computer to input the data variable parameter.

The method for testing a touch panel in the above embodiment can optionally include the following steps:

inputting the interface setting variable parameter and optionally inputting the touch controller IC variable parameter into the touch trace display unit;

displaying a touch trace on the touch panel by using the touch trace display unit;

inputting the automatic test variable parameter and optionally inputting the interface setting variable parameter and/or the touch controller IC variable parameter into the automatic test unit;

automatically testing the touch panel by using the automatic test unit;

inputting the manual test variable parameter and optionally inputting the interface setting variable parameter and/or the touch controller IC variable parameter into the manual test unit; and manually testing the touch panel by using the manual test unit.

The manual test variable parameter in the above can optionally include a frame-erasing test variable parameter, a linear test variable parameter, an accuracy test variable parameter and the size of the panel.

The step of manually testing the touch panel by using the manual test unit in the above can optionally include the following step: performing a frame-erasing test for the touch panel; performing a linear test for the touch panel, and performing an accuracy test for the touch panel.

Figure 2:
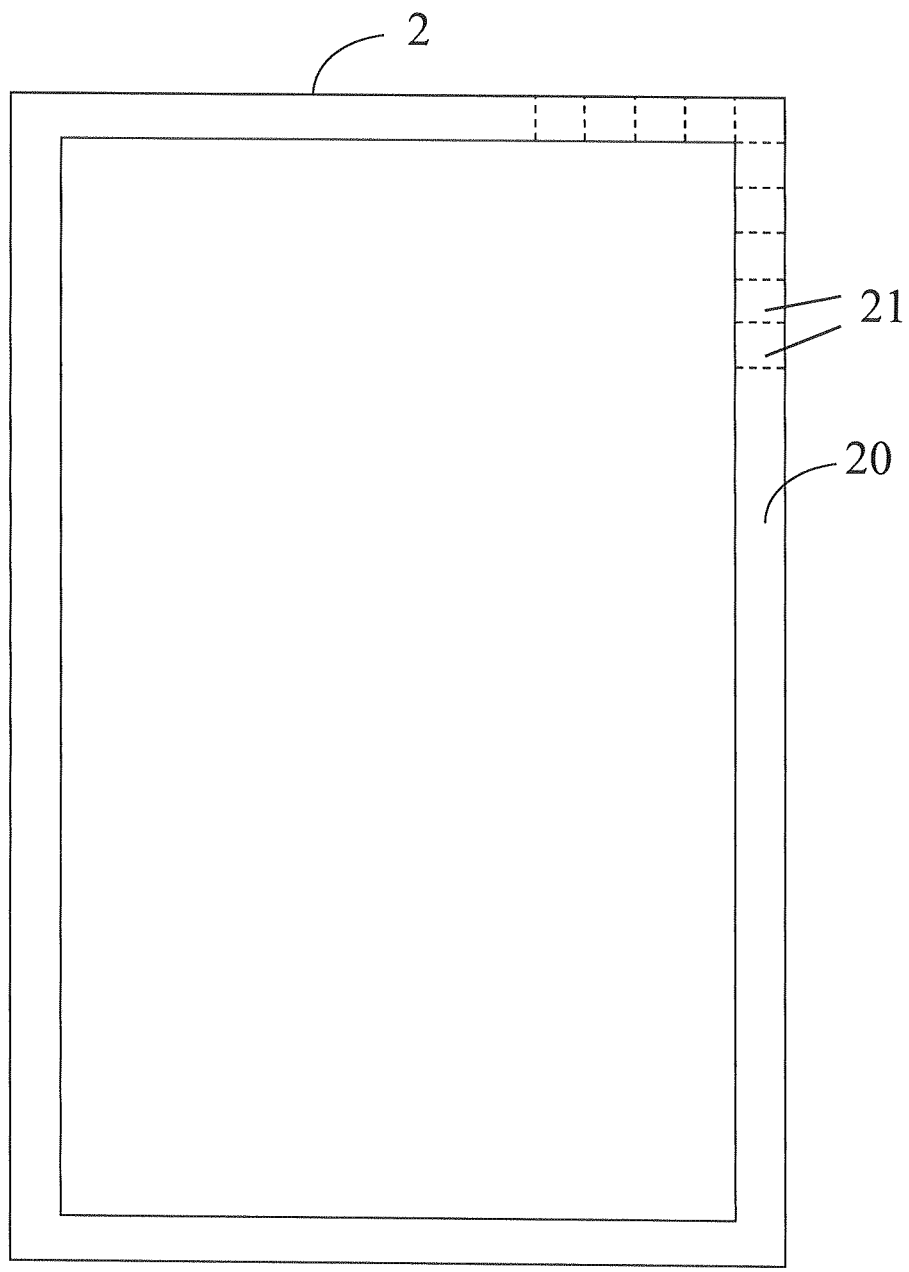
FIG. 2 is the schematic diagram showing a picture displayed on the touch panel during a frame-erasing test in one embodiment of the present invention.

FIG. 2 shows a picture displayed on the touch panel during the above frame-erasing test. In the embodiment shown in FIG. 2, the step of performing the frame-erasing test for the touch panel in the above can optionally include the following sub-steps:

allowing a user to use the frame-erasing test process, to input the frame-erasing test variable parameter and to perform a frame-erasing test;

defining a frame area 20 including plural blocks 21 around the perimeter of the touch panel 2 by applying the frame-erasing test process, wherein the frame-erasing test variable parameter includes a size of each of the plural blocks 21 and a frame-erasing test time, and each of the plural blocks has a block area;

touching the plural blocks 21 one by one for performing the frame-erasing test;

causing the touch trace display unit to receive a touch trace resulting from the frame-erasing test;

erasing a testing block, which is one of the plural blocks 21 and is currently under the frame-erasing test, only when the touch trace for the testing block is located within the block area of the testing block; while the testing block is not erased when the touch trance for the testing block is located outside the block area of the testing block;

determining that the touch panel 2 passes the frame-erasing test, when all the plural blocks 21 are erased during the frame-erasing test time; and determining that the touch panel 2 fails to pass the frame-erasing test, when at least one of the plural blocks 21 is not erased during the frame-erasing test time.

Figure 3:
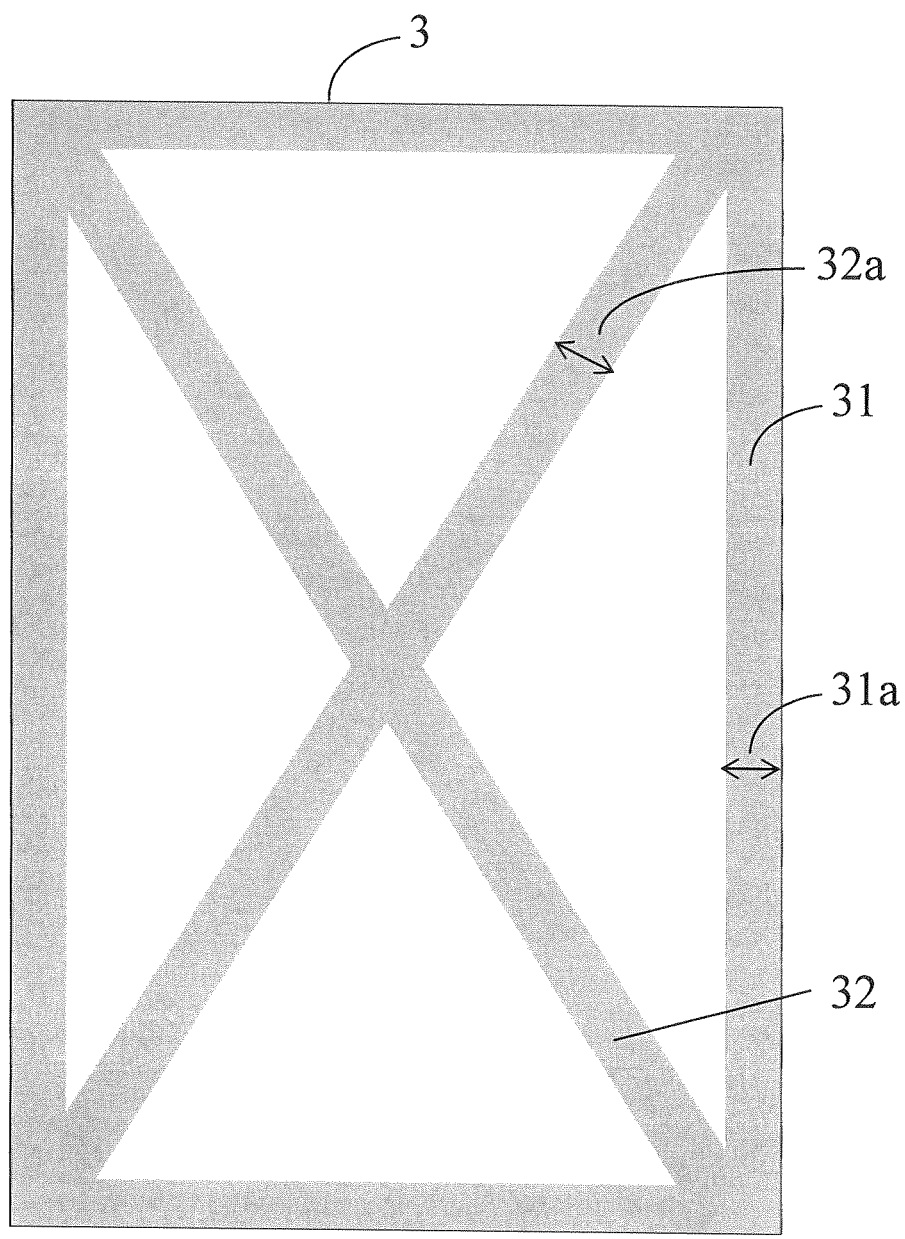
FIG. 3 is the schematic diagram showing a picture displayed on the touch panel during a linear test in one embodiment of the present invention.

FIG. 3 shows a picture displayed on the touch panel during the above linear test. In the embodiment shown in FIG. 3, the step of performing the linear test for the touch panel in the above can optionally include the following sub-steps:

allowing a user to use the linear test process, to input the linear test variable parameter and to perform a linear test;

defining four edge lines 31 located on the perimeter of the touch panel 3 and two diagonal lines 32 of the touch panel 3 by applying the linear test process, wherein the linear test variable parameter includes a first width area 31a for each of the four edge lines, a second width area 32a for each of the two diagonal lines and a linear test time;

touching the four edge lines 31 and the two diagonal lines 32 one by one for performing the linear test;

causing the touch trace display unit to receive plural touch traces resulting from the linear test;

determining that the touch panel 3 passes the linear test, when all the plural touch traces for all the four edge lines 31 and the two diagonal lines 32 are respectively located within the first width area 31a and the second width area 32a; and determining that the touch panel 3 fails to pass the linear test, when at least one of the plural touch traces is located outside at least one of the first width area 31a and the second width area 32a.

Based on the concept of the present invention, the linear test certainly can use other geometric lines besides the above four edges lines and two diagonal lines. For example, the line connecting the middle points of the top and bottom edges, the line connecting the middle points of the right and left edges, i.e. cross lines, and four edge lines can be adopted instead. Certainly other combinations of various geometric lines can be adopted as well, and are within the concept of the present invention.

Figure 4:
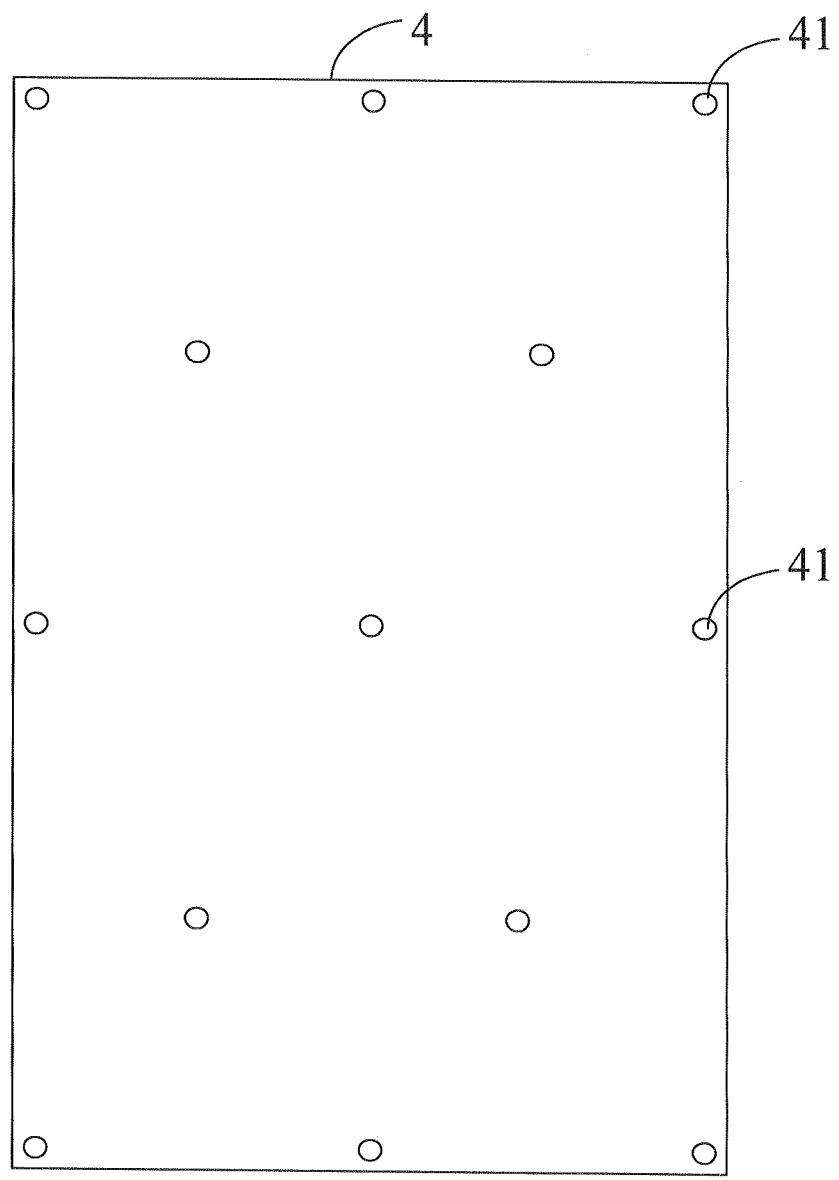
FIG. 4 is the schematic diagram showing a picture displayed on the touch panel during an accuracy test in one embodiment of the present invention.

FIG. 4 shows a picture displayed on the touch panel during the above accuracy test. In the embodiment shown in FIG. 4, the step of performing the accuracy test for the touch panel in the above can optionally include the following sub-steps:

allowing a user to use the accuracy test process, to input the accuracy test variable parameter and to perform an accuracy test;

defining four corner points respectively disposed at the four corners of the touch panel 4, four first middle points respectively on the four edges of the perimeter of the touch panel 4, a cross point of the two diagonals of the touch panel 4, and four second middle points respectively disposed between the four corner points and the cross point, as totally thirteen test points;

defining a test circle 41 for each of the thirteen test points, wherein each of the test circle 41 has a circle area, a center disposed right on the each test point and a radius determining a tolerance of the accuracy test, and the accuracy test variable parameter includes the radius and an accuracy test time;

touching the each test point one by one for performing the accuracy test;

causing the touch trace display unit to receive plural touch traces resulting from the accuracy test;

determining that the touch panel 4 passes the accuracy test, when each of the plural touch traces for each of the thirteen test points is located within the circle area of the test circle 41 of the each test point; and determining that the touch panel 4 fails to pass the accuracy test, when at least one of the plural touch traces is located outside the circle area of at least one of the test circles 41.

Based on the concept of the present invention, certainly the accuracy test can adopt the test points in other positions besides the above thirteen points. For example, the long edge of the touch panel can be divided into three equal segments by two partition points, which can be used as two test points instead of only one middle point in the above. That is, there will be one more test point for each long edge, and this definition of test points is especially suitable to the touch panel with a high length-to-width ratio. Certainly, when a size of a touch panel is quite large, the test points can be appropriately added, and vice versa. Therefore, the appropriate adjustments of the quantity and the positions of the test points are still within the concept of the present invention.

Figure 5A:
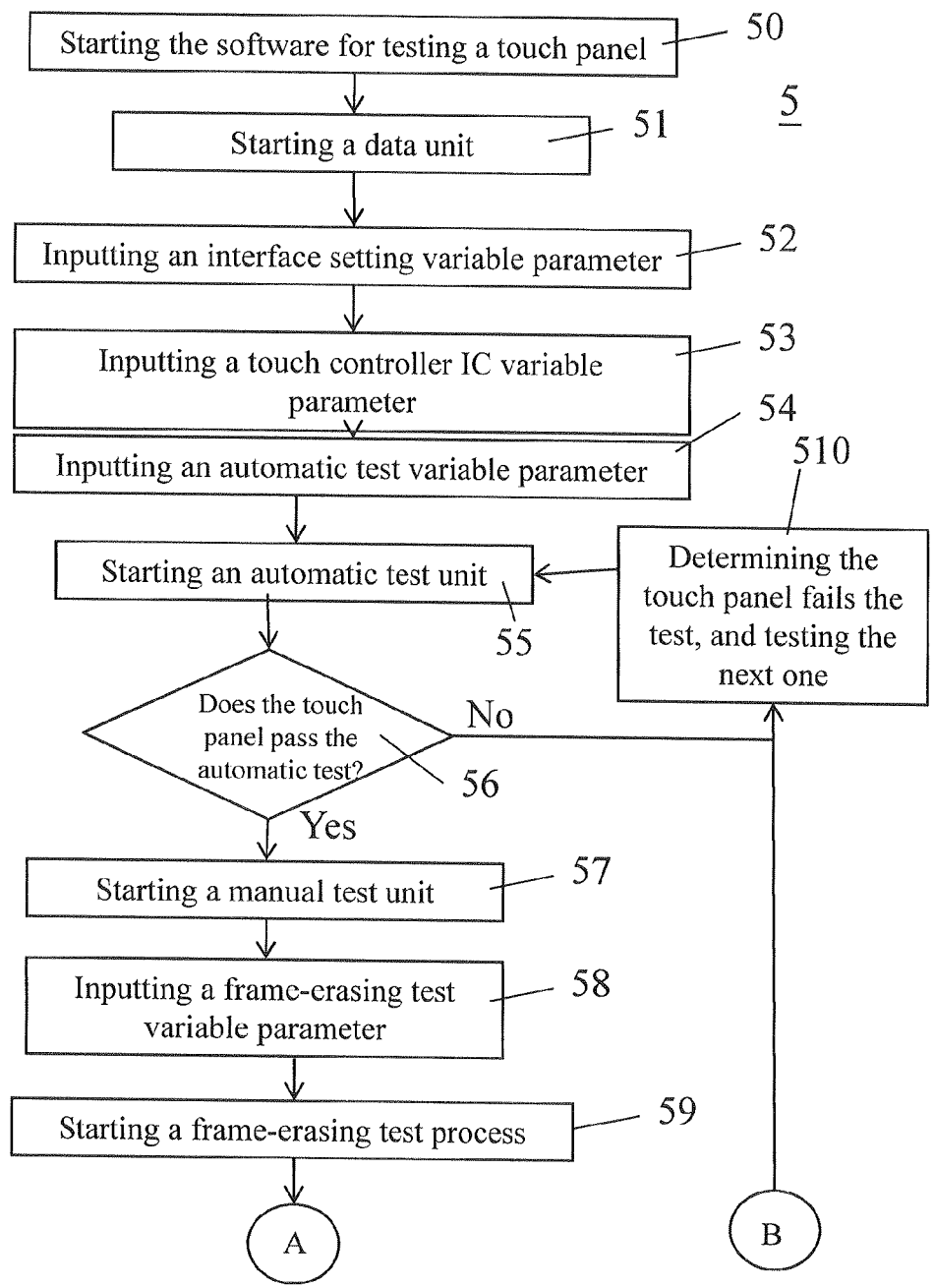
FIGS. 5A and 5B are the schematic diagrams together showing a flowchart of a method for testing a touch panel in one embodiment of the present invention.
Figure 5B:
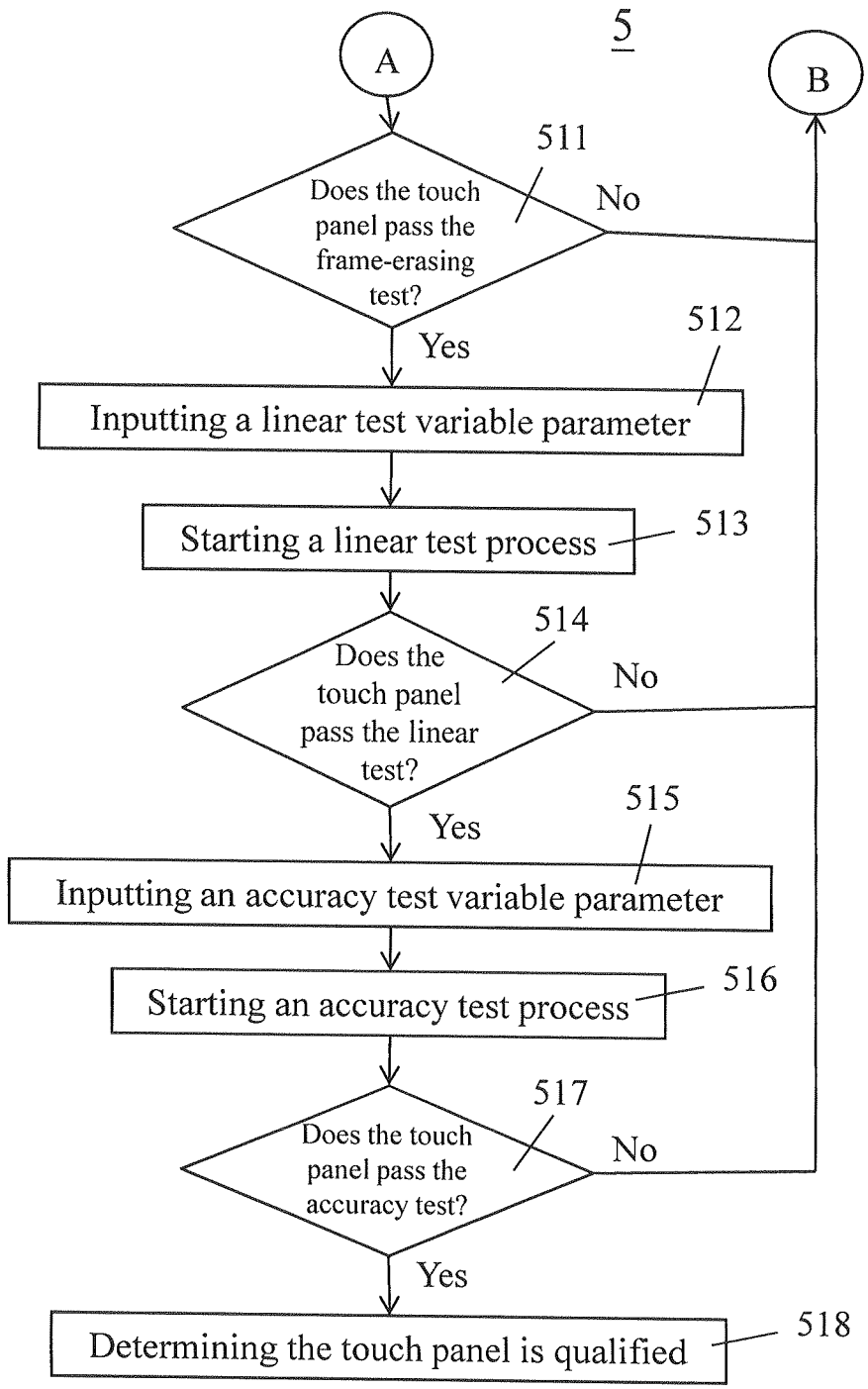

FIGS. 5A and 5B show a flowchart of a method for testing a touch panel in one embodiment of the present invention. Since this flowchart is too long to be displayed in a single page, this flowchart is displayed in two pages, and the combination of FIGS. 5A and 5B shows a complete single flowchart. In this embodiment, the step 50 of starting the software for testing a touch panel is performed. Then the step 51 of starting a data unit is performed. The step of inputting an interface setting variable parameter is performed in the step 52. The step of inputting a touch controller IC variable parameter is performed in the step 53. The step of inputting an automatic test variable parameter is performed in the step 54. The step of starting an automatic test unit is performed in the step 55. In the step 56, it is determined whether the touch panel passes the automatic test. If the answer is yes, then the following step 57 of starting a manual test unit is performed. If the answer is no, the step 510 of determining that the touch panel fails the test and testing the next touch panel is performed, and then the current step goes back to the step 55. After the step 57, the step 58 of inputting a frame-erasing test variable parameter is performed. Then, the step 59 of starting a frame-erasing test process is followed. After the step 59, it is determined whether the touch panel passes the frame-erasing test in the step 511. If the answer is yes, the step 512 of inputting a linear test variable parameter is performed. If the answer is no, the step 510 of determining that the touch panel fails the test and testing the next touch panel is performed, and then the current step goes back to the step 55. After the step 512, the step 513 of starting a linear test process is performed. Then, it is determined whether the touch panel passes the linear test in the step 514. If the answer is yes, the step 515 of inputting an accuracy test variable parameter is performed. If the answer is no, then the step 510 of determining that the touch panel fails the test and testing the next touch panel is performed, and then the current step goes back to the step 55. After the step 515, the step 516 of stating an accuracy test process is performed. Then, it is determined whether the touch panel passes the accuracy test in the step 517. If the answer is yes, the step 518 of determining that the touch panel is qualified is done, and the whole tests for the touch panel are completed. If the answer is no, the step 510 of determining that the touch panel fails the test and testing the next touch panel is performed, and then the current step goes back to the step 55.

The method for testing a touch panel as shown in FIGS. 5A and 5B is exemplified just for one embodiment of the present invention. Thus, the steps can be appropriately added into or eliminated from FIGS. 5A and 5B based on the actual conditions and requirements of the touch panels to be tested for ensuring the sensitivity and accuracy of the touched positions on the touch panels or for reducing the test costs. The above addition or elimination of some steps is still within the concept of the present invention.

Figure 6:
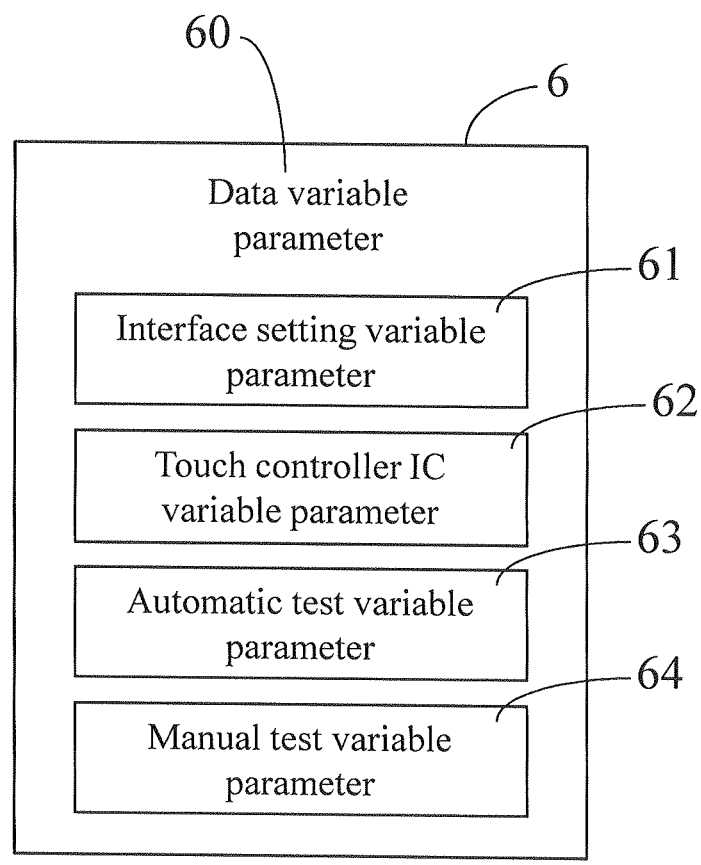
FIG. 6 is the schematic diagram showing a block diagram of a software for testing a touch panel in one embodiment of the present invention.

FIG. 6 shows a block diagram of the software for testing a touch panel in one embodiment of the present invention. In this embodiment, the software 6 for testing a touch panel includes a data variable parameter 60, which further includes one selected from a group consisting of an interface setting variable parameter 61, a touch controller IC variable parameter 62, an automatic test variable parameter 63, a manual test variable parameter 64 and a combination thereof In this embodiment, the software 6 for testing a touch panel includes the data variable parameter 60, which can be determined by a user based on the touch panel to be tested. Therefore, the software 6 for testing a touch panel in this embodiment can be applied to test the touch panels with various sizes and specifications, without exchanging the software according to the sizes and specifications of the touch panels. Accordingly, the software 6 for testing a touch panel in this embodiment can provide convenience and reduce the costs.

Figure 7:
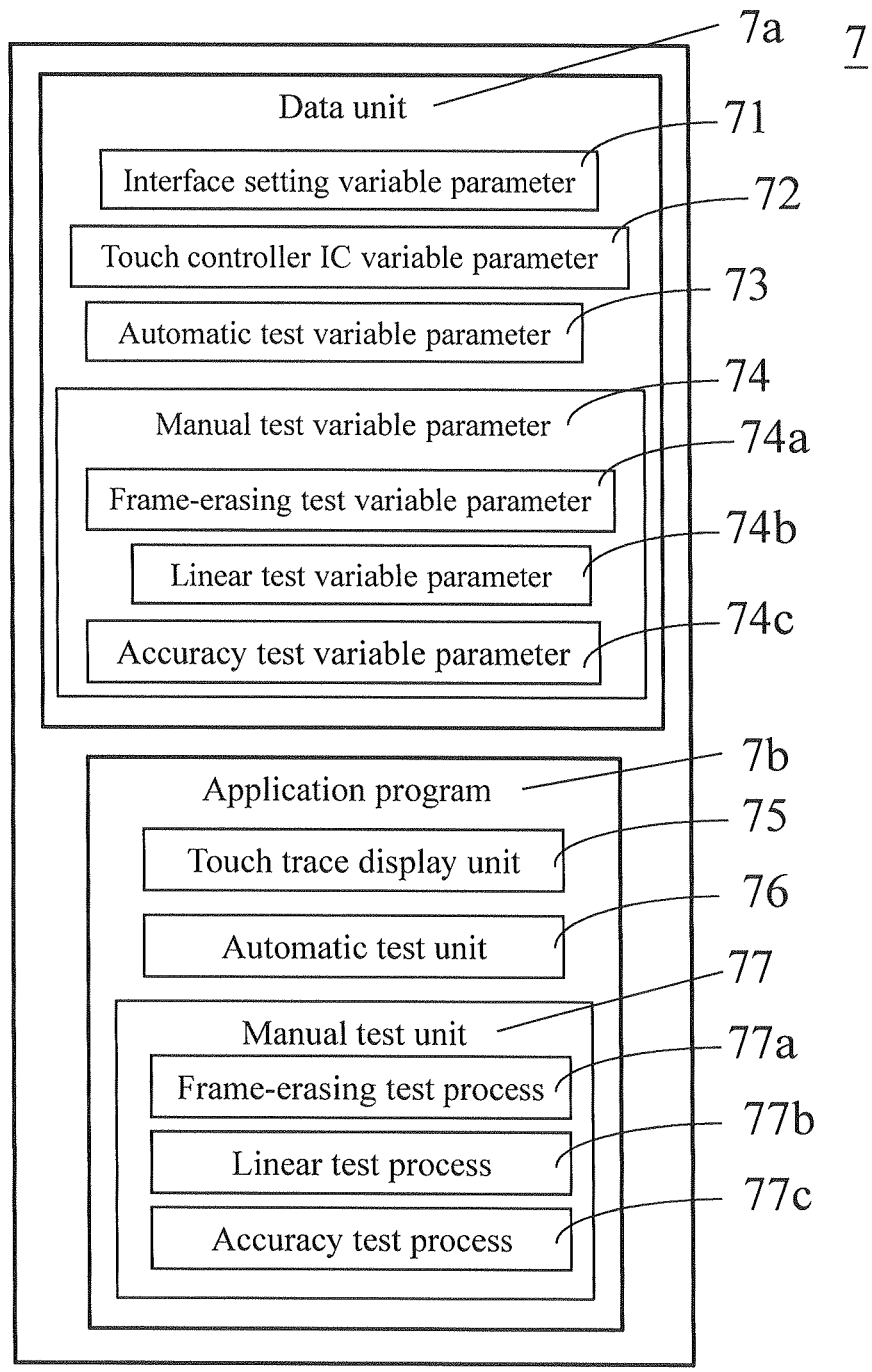
FIG. 7 is the schematic diagram showing a block diagram of a software for testing a touch panel in another embodiment of the present invention.

FIG. 7 shows a block diagram of the software for testing a touch panel in another embodiment of the present invention. In FIG. 7, the software 7 for testing a touch panel includes a data unit 7a and application program 7b. The data unit 7a includes an interface setting variable parameter 71, a touch controller IC variable parameter 72, an automatic test variable parameter 73 and a manual test variable parameter 74. The manual test variable parameter 74 further includes a frame-erasing test variable parameter 74a, a linear test variable parameter 74b and an accuracy test variable parameter 74c. In addition, the application program 7b includes a touch trace display unit 75, an automatic test unit 76 and a manual test unit 77. The manual test unit 77 includes instruction sets of a frame-erasing test process 77a, a linear test process 77b and an accuracy test process 77c.

All the above units, processes and variable parameters in the software 7 for testing a touch panel as shown in FIG. 7 can be applied to all the methods for testing touch panels in the above embodiments.

Some embodiments of the present invention are described in the followings.

1. A method for testing a touch panel comprises steps of providing the touch panel; providing a software for testing the touch panel, wherein the software contains a data variable parameter including one selected from a group consisting of an interface setting variable parameter, a touch controller IC variable parameter, an automatic test variable parameter, a manual test variable parameter and a combination thereof; and determining the data variable parameter corresponding to the touch panel so as to test the touch panel.

2. In a method of embodiment 1, the step of providing the software includes sub-steps of providing a computer; and installing the software into the computer.

3. In a method of any one of the above embodiments, the software comprises a data unit including the data variable parameter, and the step of determining the data variable parameter includes a sub-step of allowing a user to use the data unit of the software in the computer to input the data variable parameter.

4. In a method of any one of the above embodiments, the software comprises a data unit and an application program, the data unit includes the data variable parameter, and the application program includes a touch trace display unit, an automatic test unit and a manual test unit.

5. A method of any one of the above embodiments further comprises steps of inputting the interface setting variable parameter and optionally inputting the touch controller IC variable parameter into the touch trace display unit; and displaying a touch trace on the touch panel by using the touch trace display unit.

6. A method of any one of the above embodiments further comprises steps of inputting the automatic test variable parameter and optionally inputting the interface setting variable parameter into the is automatic test unit; and automatically testing the touch panel by using the automatic test unit.

7. In a method of any one of the above embodiments, the manual test variable parameter includes a frame-erasing test variable parameter, a linear test variable parameter, an accuracy test variable parameter and a dimension of the touch panel, and the method further comprises steps of inputting the manual test variable parameter and optionally inputting the interface setting variable parameter into the manual test unit; and manually testing the touch panel by using the manual test unit.

8. In a method of any one of the above embodiments, the manual test unit includes an instruction set of a frame-erasing test process, the touch panel has a perimeter, and the step of manually testing the touch panel includes sub-steps of allowing a user to use the frame-erasing test process, to input the frame-erasing test variable parameter and to perform a frame-erasing test; defining a frame area including plural blocks around the perimeter of the touch panel by applying the frame-erasing test process, wherein the frame-erasing test variable parameter includes a size of each of the plural blocks and a frame-erasing test time, and each of the plural blocks has a block area; touching the plural blocks one by one for performing the frame-erasing test; causing the touch trace display unit to receive a touch trace resulting from the frame-erasing test; erasing a testing block being one of the plural blocks and currently under the frame-erasing test, only when the touch trace for the testing block is located within the block area of the testing block; determining that the touch panel passes the frame-erasing test, when all the plural blocks are erased during the frame-erasing test time; and determining that the touch panel fails to pass the frame-erasing test, when at least one of the plural blocks is not erased.

9. In a method of any one of the above embodiments, the manual test unit includes an instruction set of a linear test process, the touch panel has a perimeter, and the step of manually testing the touch panel includes sub-steps of allowing a user to use the linear test process, to input the linear test variable parameter and to perform a linear test; defining four edge lines located on the perimeter of the touch panel and two diagonal lines by applying the linear test process, wherein the linear test variable parameter includes a first width area for each of the four edge lines, a second width area for each of the two diagonal lines and a linear test time; touching the four edge lines and the two diagonal lines one by one for performing the linear test; causing the touch trace display unit to receive plural touch traces resulting from the linear test; determining that the touch panel passes the linear test, when all the plural touch traces for all the four edge lines and the two diagonal lines are respectively located within the first width area and the second width area; and determining that the touch panel fails to pass the linear test, when at least one of the plural touch traces is located outside at least one of the first width area and the second width area.

10. In a method of any one of the above embodiments, the manual test unit includes an instruction set of an accuracy test process, the touch panel has a perimeter, four corners, two diagonals and four edges on the perimeter, and the step of manually testing the touch panel includes sub-steps of allowing a user to use the accuracy test process, to input the accuracy test variable parameter and to perform an accuracy test; defining four corner points respectively disposed at the four corners, four first middle points respectively on the four edges of the perimeter, a cross point of the two diagonals and four second middle points respectively disposed between the four corner points and the cross point, as totally thirteen test points; defining a test circle for each of the thirteen test points, wherein each of the test circle has a circle area, a center disposed right on the each test point and a radius determining a tolerance of the accuracy test, and the accuracy test variable parameter includes the radius and an accuracy test time; touching the each test point one by one for performing the accuracy test; causing the touch trace display unit to receive plural touch traces resulting from the accuracy test; determining that the touch panel passes the accuracy test, when each of the plural touch traces for each of the thirteen test points are located within the circle area of the test circle of the each test point; and determining that the touch panel fails to pass the accuracy test, when at least one of the plural touch traces is located outside the circle area of at least one of the test circles.

11. A software for testing a touch panel comprises a data variable parameter including one selected from a group consisting of an interface setting variable parameter, a touch controller IC variable parameter, an automatic test variable parameter, a manual test variable parameter and a combination thereof.

12. A software of any one of the above embodiments further comprises a data unit including the data variable parameter, wherein the data unit allows a user to input the data variable parameter.

13. A software of any one of the above embodiments further comprises an application program including a touch trace display unit inputted with the interface setting variable parameter, optionally inputted with the touch controller IC variable parameter, and displaying a touch trace on the touch panel; an automatic test unit inputted with the automatic test variable parameter, optionally inputted with the interface setting variable parameter and the touch controller IC variable parameter, and performing an automatic test for the touch panel; and a manual test unit performing a manual test.

14. In a software of any one of the above embodiments, the touch panel has a perimeter, the manual test variable parameter includes a is frame-erasing variable parameter, and the software comprises a manual test unit including a frame-erasing process defining a frame area including plural blocks around the perimeter of the touch panel, inputted with the frame-erasing variable parameter, and performing a frame-erasing test, wherein the frame-erasing test variable parameter includes a size of each of the plural blocks and a frame-erasing test time.

15. In a software of any one of the above embodiments, the touch panel has a perimeter, the manual test variable parameter includes a linear test variable parameter, and the software comprises a manual test unit including a linear test process defining four edge lines located on the perimeter of the touch panel and two diagonal lines, and performing a linear test, wherein the linear test variable parameter includes a first width area for each of the four edge lines, a second width area for each of the two diagonal lines and a linear test time.

16. In a software of any one of the above embodiments, the touch panel has a perimeter, four corners, two diagonals and four edges on the perimeter, the manual test variable parameter includes an accuracy test variable parameter, and the software comprises a manual test unit including an accuracy process defining four corner points respectively disposed on the four corners, four first middle points respectively on the four edges of the perimeter, a cross point of the two diagonals and four second middle points respectively disposed between the four corner points and the cross point, as totally thirteen test points, defining a test circle for each of the test points, and performing an accuracy test, wherein each of the test circle has a center disposed right on the each test point and a radius determining a tolerance of the accuracy test, and the accuracy test variable parameter includes the radius and an accuracy test time.

17. An electronic device is installed with the software of any one of the above embodiments.

18. A storage medium stores the software of any one of the above embodiments.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for testing a touch panel, comprising steps of:
   providing the touch panel with a perimeter;
   non-transitory computer readable storage medium stored in a non-transitory memory for testing the touch panel, a data unit and an application program, the data unit includes an interface setting variable parameter, a touch controller IC variable parameter, an automatic test variable parameter, a manual test variable parameter and a combination thereof;
   the application program includes a touch trace display unit, an automatic test unit, a manual test unit,
   the manual test variable parameter includes a frame-erasing test variable parameter, a linear test variable parameter, an accuracy test variable parameter;
   the manual test unit comprising:
   a frame erasing test process, a linear test process, an accuracy test process;
   determining the data variable parameter corresponding to the touch panel so as to test the touch panel;
   inputting the manual test variable parameter and optionally inputting the interface setting variable parameter into the manual test unit; and manually testing the touch panel by using the manual test unit, and
   the frame erasing test process defining a frame area including plural blocks around the perimeter of the touch panel, inputted with the frame-erasing test variable parameter by a user, and performing a frame-erasing test, wherein the frame-erasing test variable parameter includes a size of each of the plural blocks and a frame-erasing test time; determining that the touch panel passes the frame-erasing test, when all the plural blocks are erased during the frame-erasing test time; and determining that the touch panel fails to pass the frame-erasing test, when at least one of the plural blocks is not erased.

2. A method of claim 1, wherein the step of providing the software includes sub-steps of:
   providing a computer; and
   installing the software into the computer.

3. A method of claim 2, wherein the software comprises a data unit including the data variable parameter, and the step of determining the data variable parameter includes a sub-step of allowing a user to use the data unit of the software in the computer to input the data variable parameter.

4. A method of claim 1, further comprising steps of:
   inputting the interface setting variable parameter and optionally inputting the touch controller IC variable parameter into the touch trace display unit; and
   displaying a touch trace on the touch panel by using the touch trace display unit.

5. A method of claim 1, further comprising steps of:
   inputting the automatic test variable parameter and optionally inputting the interface setting variable parameter into the automatic test unit; and
   automatically testing the touch panel by using the automatic test unit.

6. A method of claim 1, wherein the manual test unit includes an instruction set of a linear test process, the touch panel has a perimeter, and the step of manually testing the touch panel includes sub-steps of:
   allowing a user to use the linear test process, to input the linear test variable parameter and to perform a linear test;
   defining four edge lines located on the perimeter of the touch panel and two diagonal lines by applying the linear test process, wherein the linear test variable parameter includes a first width area for each of the four edge lines, a second width area for each of the two diagonal lines and a linear test time;
   touching the four edge lines and the two diagonal lines one by one for performing the linear test;
   causing the touch trace display unit to receive plural touch traces resulting from the linear test;
   determining that the touch panel passes the linear test, when all the plural touch traces for all the four edge lines and the two diagonal lines are respectively located within the first width area and the second width area; and
   determining that the touch panel fails to pass the linear test, when at least one of the plural touch traces is located outside at least one of the first width area and the second width area.

7. A method of claim 1, wherein the manual test unit includes an instruction set of an accuracy test process, the touch panel has a perimeter, four corners, two diagonals and four edges on the perimeter, and the step of manually testing the touch panel includes sub-steps of:
   allowing a user to use the accuracy test process, to input the accuracy test variable parameter and to perform an accuracy test;
   defining four corner points respectively disposed at the four corners, four first middle points respectively on the four edges of the perimeter, a cross point of the two diagonals and four second middle points respectively disposed between the four corner points and the cross point, as totally thirteen test points;
   defining a test circle for each of the thirteen test points, wherein each of the test circle has a circle area, a center disposed right on the each test point and a radius determining a tolerance of the accuracy test, and the accuracy test variable parameter includes the radius and an accuracy test time;

touching the each test point one by one for performing the accuracy test;

causing the touch trace display unit to receive plural touch traces resulting from the accuracy test;

determining that the touch panel passes the accuracy test, when each of the plural touch traces for each of the thirteen test points is located within the circle area of the test circle of the each test point; and determining that the touch panel fails to pass the accuracy test, when at least one of the plural touch traces is located outside the circle area of at least one of the test circles.

8. An electronic device, installed with the software of claim 1.

9. A storage medium, storing the software of claim 1.

10. A non-transitory computer readable storage medium stored in a non-transitory memory for testing a touch panel having a perimeter, comprising:

data the data unit comprising a data variable parameter including an interface setting variable parameter, a touch controller IC variable parameter, an automatic test variable parameter, a manual test variable parameter including a frame-erasing variable parameter and a combination thereof; and the application program comprising a manual test unit including:

a frame erasing test process defining a frame area including plural blocks around the perimeter of the touch panel, inputted with the frame-erasing test variable parameter by a user, and performing a frame-erasing test, wherein the frame-erasing test variable parameter includes a size of each of the plural blocks and a frame-erasing test time; determining that the touch panel passes the frame-erasing test, when all the plural blocks are erased during the frame-erasing test time; and determining that the touch panel fails to pass the frame-erasing test, when at least one of the plural blocks is not erased.

11. A non-transitory computer readable storage medium stored in a non-transitory memory of claim 10, further comprising an application program including:

a touch trace display unit inputted with the interface setting variable parameter, optionally inputted with the touch controller IC variable parameter, and displaying a touch trace on the touch panel;

an automatic test unit inputted with the automatic test variable parameter, optionally inputted with the interface setting variable parameter and the touch controller IC variable parameter, and performing an automatic test for the touch panel; and a manual test unit performing a manual test.

12. A non-transitory computer readable storage medium stored in a non-transitory memory of claim 10, wherein the touch panel has a perimeter, four corners, two diagonals and four edges on the perimeter, the manual test variable parameter includes an accuracy test variable parameter, and the software comprises a manual test unit including:

an accuracy process defining four corner points respectively disposed on the four corners, four first middle points respectively on the four edges of the perimeter, a cross point of the two diagonals and four second middle points respectively disposed between the four corner points and the cross point, as totally thirteen test points, defining a test circle for each of the test points, and performing an accuracy test, wherein each of the test circle has a center disposed right on the each test point and a radius determining a tolerance of the accuracy test, and the accuracy test variable parameter includes the radius and an accuracy test time.

13. An electronic device, installed with the non-transitory computer readable storage medium stored in a non-transitory memory of claim 10.

14. A storage medium, storing the non-transitory computer readable storage medium stored in a non-transitory memory of claim 10.

15. A non-transitory computer readable storage medium stored in a non-transitory memory for testing a touch panel having a perimeter, comprising:

data unit and application program, the data unit including an interface setting variable parameter, a touch controller IC variable parameter, an automatic test variable parameter, a manual test variable parameter including a linear test variable parameter and a combination thereof; and the application program including a manual test unit including:

a linear test process defining four edge lines located on the perimeter of the touch panel and two diagonal lines, and performing a linear test, wherein the linear test variable parameter includes a first width area for each of the four edge lines, a second width area for each of the two diagonal lines and a linear test time determining that the touch panel passes the linear test, when all the plural touch traces for all the four edge lines and the two diagonal lines are respectively located within the first width area and the second width area; and determining that the touch panel fails to pass the linear test, when at least one of the plural touch traces is located outside at least one of the first width area and the second width area.

16. A non-transitory computer readable storage medium stored in a non-transitory memory of claim 15, further comprising an application program including:

a touch trace display unit inputted with the interface setting variable parameter, optionally inputted with the touch controller IC variable parameter, and displaying a touch trace on the touch panel;

an automatic test unit inputted with the automatic test variable parameter, optionally inputted with the interface setting variable parameter and the touch controller IC variable parameter, and performing an automatic test for the touch panel; and a manual test unit performing a manual test.

17. A non-transitory computer readable storage medium stored in a non-transitory memory for testing a touch panel, wherein the touch panel having a perimeter and four corners, comprises:

data unit and application program, the data unit including an interface setting variable parameter, a touch controller IC variable parameter, an automatic test variable parameter, a manual test variable parameter including a linear test variable parameter and a combination thereof; and the application program including a manual test unit including:

an accuracy process defining four corner points respectively disposed on the four corners, four first middle points respectively on the four edges of the perimeter, a cross point of the two diagonals and four second middle points respectively disposed between the four corner points and the cross point, as totally thirteen test points, defining a test circle for each of the test points, and performing an accuracy test, wherein each of the test circle has a center disposed right on the each test point and a radius determining a tolerance of the accuracy test, and the accuracy test variable parameter includes the radius and an accuracy test time.

* * * * *